United States Patent
Gradu

(10) Patent No.: US 6,712,730 B2
(45) Date of Patent: Mar. 30, 2004

(54) ACTIVE TORQUE BIAS COUPLING

(75) Inventor: Mircea Gradu, Wooster, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/006,312

(22) Filed: Dec. 6, 2001

(65) Prior Publication Data

US 2003/0109351 A1 Jun. 12, 2003

(51) Int. Cl.⁷ .......................... F16H 37/14; F16D 27/00
(52) U.S. Cl. ...................... 475/218; 475/329; 192/3.52; 192/21.5
(58) Field of Search ................ 475/149, 150, 475/152, 154, 156, 218, 329; 192/21.5, 84.31, 3.51, 3.52; 180/233, 371, 372

(56) References Cited

U.S. PATENT DOCUMENTS

| 2,709,928 | A | * | 6/1955 | Jones .......................... 475/154 |
| 4,037,694 | A | * | 7/1977 | Keese ...................... 180/372 X |
| 4,142,615 | A | * | 3/1979 | Sidles et al. ............. 180/372 X |
| 4,417,641 | A |   | 11/1983 | Kageyama |
| 4,424,874 | A | * | 1/1984 | Koike et al. ............. 180/372 X |
| 4,606,446 | A |   | 8/1986 | Watanabe |
| 4,656,889 | A |   | 4/1987 | Mueller |
| 4,803,628 | A |   | 2/1989 | Hayashi et al. |
| 4,860,612 | A |   | 8/1989 | Dick et al. |
| 4,866,624 | A |   | 9/1989 | Nishikawa et al. |
| 4,871,049 | A |   | 10/1989 | Okita |
| 4,995,862 | A |   | 2/1991 | Arocha |
| 5,469,950 | A |   | 11/1995 | Lundström et al. |
| 5,497,333 | A |   | 3/1996 | Sasaki |
| 5,595,214 | A |   | 1/1997 | Shaffer et al. |
| 5,713,444 | A | * | 2/1998 | Schroeder ................... 192/21.5 |
| 5,733,222 | A |   | 3/1998 | Kawahara et al. |
| 5,845,753 | A | * | 12/1998 | Bansbach ................... 192/21.5 |
| 5,890,983 | A | * | 4/1999 | Kawahara et al. ........... 475/149 |
| 5,941,788 | A |   | 8/1999 | Shaffer et al. |
| 5,979,631 | A |   | 11/1999 | Lundström |
| 5,980,415 | A |   | 11/1999 | Showalter |
| 6,098,770 | A |   | 8/2000 | Isley, Jr. |
| 6,102,827 | A | * | 8/2000 | Teasdale et al. ............. 475/154 |
| 6,142,905 | A |   | 11/2000 | Brown et al. |
| 6,158,303 | A |   | 12/2000 | Shiraishi et al. |

FOREIGN PATENT DOCUMENTS

| DE | 3533142 A | | 4/1986 | |
| DE | 3533142 A1 | | 4/1986 | |
| JP | 403065472 | * | 3/1991 | .................. 180/372 |
| JP | 403070684 | * | 3/1991 | .................. 180/372 |

* cited by examiner

Primary Examiner—Ha Ho
(74) Attorney, Agent, or Firm—Polster, Lieder, Woodruff & Lucchesi, L.C.

(57) ABSTRACT

A torque coupling connects the secondary driving wheels of an automotive vehicle indirectly to the power unit of the vehicle through a variable torque coupling, while the primary driving wheels on the vehicle are connected directly to the power unit. The coupling compensates for variations in the angular velocity of the primary and secondary wheels while still transferring torque to the secondary wheels. The coupling includes a magnetic particle clutch organized about an axis and a planetary gear set organized about the same axis. The coupling has two paths through which the torque is transferred, one a mechanical path and the other a clutch path. Most of the torque is transferred through the mechanical path, while the clutch path accommodates for slippage and controls the proportion of torque delivered to the secondary wheels, with the control being solely dependent on the magnitude of the current directed through the clutch.

15 Claims, 5 Drawing Sheets

ACTIVE TORQUE BIAS COUPLING

CROSS REFERENCE TO RELATED APPLICATIONS

None

STATEMENT REGARDING FEDERALLY SPONSORED RESEARCH OR DEVELOPMENT

Not Applicable.

BACKGROUND OF THE INVENTION

The present invention relates in general to the transmission of torque and more particularly to a torque coupling and to an automotive vehicle equipped with the coupling for apportioning torque between wheels of the vehicle.

Most light automotive vehicles, such as automobiles, sport-utility vehicles, vans and light trucks, have four wheels, but in the typical vehicle the engine which propels the vehicle is coupled to only two of the wheels. In older vehicles the rear wheels were normally used for propulsion, but in newer vehicles it is commonly the front wheels. To be sure, some early vehicles had four-wheel drive—the Army Jeep for example—but that type of vehicle often operated with power delivered to only two wheels. If the need arose for more traction, the engine was coupled with the other two wheels through a manually operated transfer case. The rear and front wheels share the torque delivered by the engine under a fixed ratio.

In recent years automotive manufacturers have produced some of their more sophisticated vehicles with so-called "all wheel drive". In the typical vehicle of this type all four wheels normally drive the vehicle with the engine torque split between the front and rear wheels. The engine delivers its power through a transmission which is in turn connected directly to two of the wheels—the primary driving wheels. The remaining two wheels—the secondary driving wheels—are connected to the transmission through a torque coupling which accommodates slight variations in speed between the primary and secondary wheels. To be sure, a differential is interposed between primary driving wheels and the transmission, but the connection is direct in the sense that no slippage can develop between the primary wheels and the transmission. Another differential exists between the coupling and the secondary wheels, but the coupling allows for slippage between the secondary wheels and the transmission, so the connection in that sense is indirect. The torque coupling divides the torque between the primary and secondary wheels.

Morever, some all wheel drive vehicles have couplings that have the capacity to vary the torque between the primary and secondary wheels to better accommodate varying road and operating conditions. With this type of vehicle, all of the torque delivered to the secondary wheels passes through a clutch in the torque coupling, and as a consequence the coupling is large and heavy. Apart from that, it is complex, often containing a multitude of plates and a complicated mechanism for urging the plates together with variable force. Actually, the torque transferred through such a clutch depends not only on the force exerted on the plates, but also the slippage between the plates and temperature as well. This renders control of the clutch difficult.

BRIEF SUMMARY OF THE INVENTION

A torque coupling includes a clutch and a planetary set connected such that two torque-transfer paths exist through the coupling—one a mechanical path and the other a clutch path. A clutch in the clutch path accommodates slippage in the coupling and controls the amount of torque transferred in each of the paths. The proportion of torque transmitted through the mechanical path in comparison to the torque transmitted through the clutch path is determined by the design of the planetary set and its ratios. The invention also resides in an automotive vehicle having primary and secondary wheels and a power unit, with the power unit being connected directly to the primary wheels and also being connected to the secondary wheels through the torque coupling. The amount of torque transmitted through the clutch of the torque coupling controls the apportionment of torque between the primary and secondary wheels.

BRIEF DESCRIPTION OF THE SEVERAL VIEWS OF THE DRAWINGS

Corresponding reference characters indicate corresponding parts throughout the several views of the drawings.

DETAILED DESCRIPTION OF INVENTION

Figure 1:
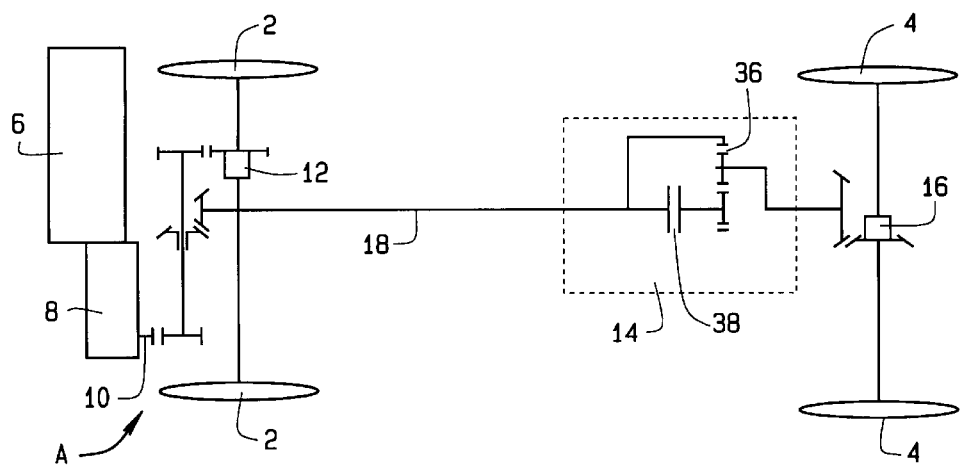
FIG. 1 is a schematic view of a front wheel drive automobile provided with a torque coupling constructed in accordance with and embodying the present invention.

Referring now to the drawings, an automotive vehicle A (FIG. 1), such as an automobile (passenger car), a sports utility vehicle, a van or even a truck, includes primary driving wheels 2, which are the front road wheels; and secondary driving wheels 4, which are the rear road wheels, It also includes a motor 6 which is either transversely or longitudinally mounted and is coupled to a transmission 8 which may be of the automatic type or manual type. The motor 6 and transmission 8 constitute a power unit which delivers torque through a transmission output shaft 10—basically the main shaft of the transmission 8. The shaft 10 of the transmission 8 is connected to the primary driving wheels 4 through a primary differential 12. The connection is direct in the sense that no slippage occurs between the output shaft 10 and the primary wheels 4. The shaft 10 of the transmission 8 is also connected to the secondary driving wheels 4 through a torque coupling 14 and a secondary differential 16, but the connection is indirect, inasmuch as the coupling 14 accords a measure of slippage between the secondary wheels 4 and the transmission shaft 10 and likewise between the secondary wheels 4 and the primary wheels 2. The slippage accommodates small variations in velocity between the primary and secondary wheels 2 and 4—changes which may be occasioned by variances in tire size or by negotiating turns. Preferably the torque coupling 14, is located at or close to the primary differential 12 and is connected to the shaft 10 of the transmission 8 through a drive shaft 18 which extends longitudinally through the vehicle A.

Figure 2:
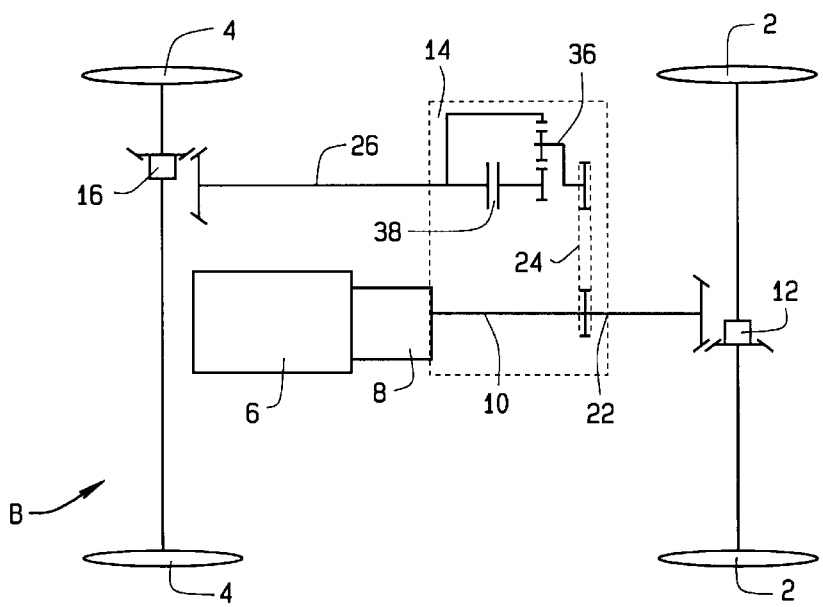
FIG. 2 is a schematic view of a rear wheel drive automobile provided with the torque coupling.

Another automotive vehicle B (FIG. 2) has essentially the same components as the vehicle A, except that they are organized differently. In the vehicle B the primary driving wheels 2 and primary differential 12 are at the rear of the vehicle B, whereas the secondary driving wheels 4 and the secondary differential 16 are at the front of the vehicle B. The motor 6 and transmission 8, while being at the front of the vehicle B, are mounted longitudinally. The shaft 10 of the transmission 8 and the primary differential 12 are connected through a primary drive shaft 22. The torque coupling 14 is connected to the shaft 10 through a chain 24, and the coupling 14 is, in turn, connected to the secondary differential 16 through a secondary drive shaft 26.

Each vehicle A and B possesses a variety of sensors which produce electrical signals that reflect the conditions under which the vehicle A or B operates, and those signals are fed to an onboard microprocessor which evaluates them and produces a signal that controls the torque coupling 14. Indeed, the signal causes the torque coupling 14 to apportion the torque delivered at the shaft 10 of the transmission 8 between the primary driving wheels 2 and the secondary driving wheels 4 to enable the vehicle A or B to best respond to the driving conditions monitored by the sensors. Among the driving conditions monitored may be angular velocity of each of the wheels 2 and 4, longitudinal acceleration, lateral acceleration, torque delivered at the shaft 10 of the transmission 8, position of the throttle for the motor 6, and position of the steering gear (steering angle).

Figure 3:
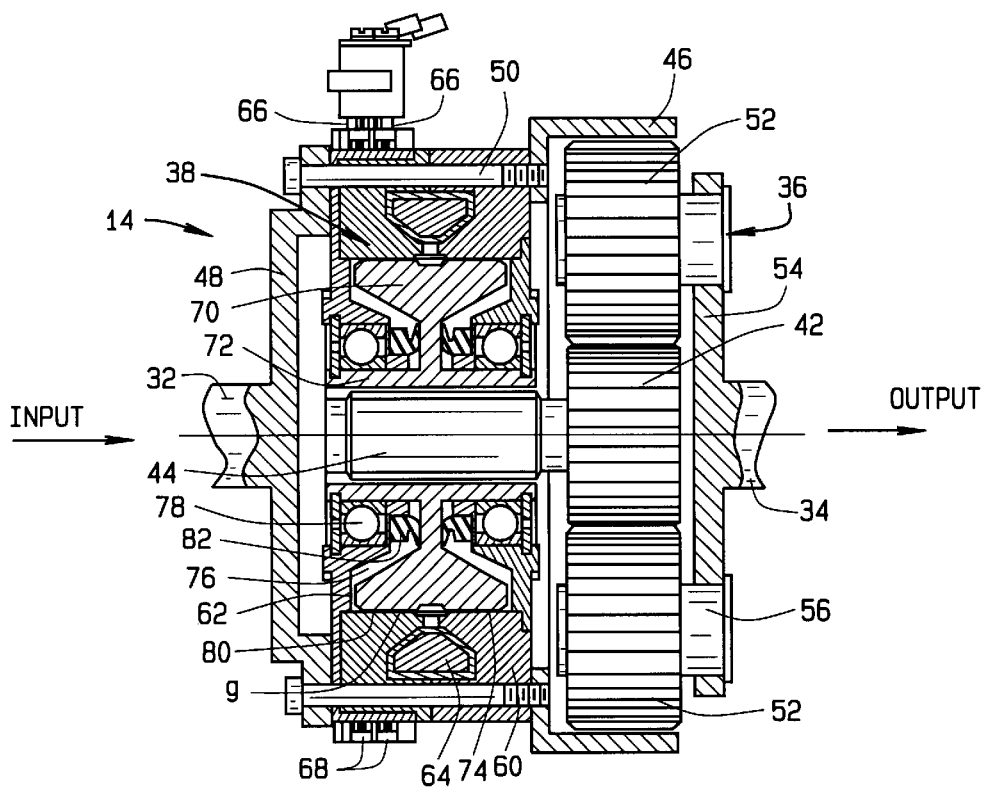
FIG. 3 is a longitudinal sectional view of the torque coupling.
Figure 4:
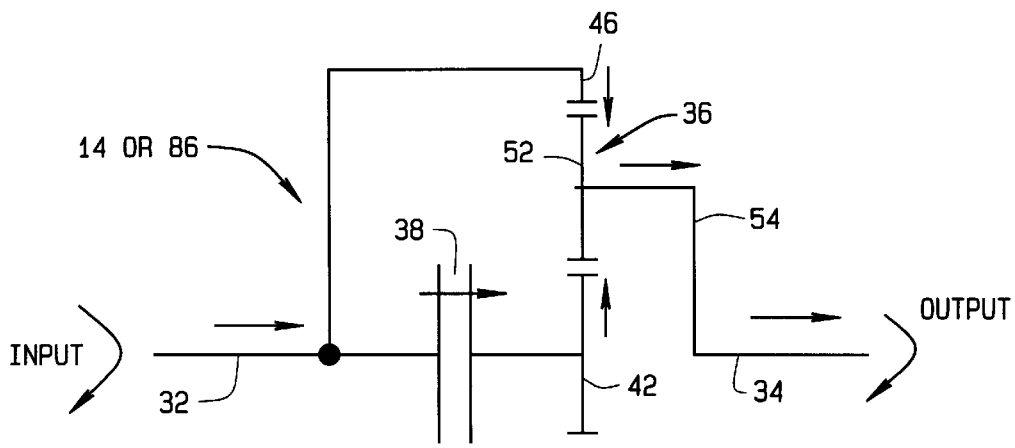
FIG. 4 is a kinematic diagram of the coupling.

The torque coupling 14 apportions the torque delivered at the transmission 8 between the primary driving wheels 2 and the secondary driving wheels 4 to best satisfy the conditions under which the vehicle A or B operates at the time. The torque coupling 14 includes (FIG. 3) an input member or shaft 32 connected to the shaft 10 of the transmission 8, and an output member or shaft 34 connected to the secondary differential 16. The two shafts 32 and 34 rotate about a common axis X. The coupling 14 also contains a planetary gear set 36 which is organized about the axis X, and is connected to both the input and output shafts 32 and 34. Finally, the coupling 14 has a magnetic particle clutch 38 which is also located around the axis X where it couples the input shaft 32 to the planetary gear set 36 such that torque is transferred between the two with slippage. The coupling 14 provides two torque transfer paths between the input shaft 32 and the output shaft 34 (FIG. 4)—one a purely mechanical path that passes through the planetary gear set 36 and the other a clutch path which passes through both the clutch 38 and the planetary gear set 36. Most of the torque passes through the mechanical path, so it is the high torque path. The clutch path serves as the low torque path.

The planetary gear set 36 includes (FIG. 3) a sun gear 42 having a stub shaft 44 extended from it into the clutch 38. It also includes a ring gear 46 to which the input shaft 32 is coupled through a flange 48 and machine screws 50, the latter of which also extend through the clutch 38 and thus couple the input shaft 32 and ring gear 46 to the clutch 38 as well. In addition, the planetary gear set 36 has planet gears 52 which are located between the sun gear 42 and ring gear 46 and engage both. Finally, the planetary gear set 36 has a carrier 54 provided with spindles 56 on which the planet gears 52 rotate. The carrier 54 is connected directly to the output shaft 34. The gears 42, 46, and 52 and the carrier 54 constitute elements of the planetary set 36.

The magnetic particle clutch 38 includes (FIG. 3) an electromagnet 60 which is captured between the flange 48 on the input shaft 32 and the ring gear 46 of the planetary gear set 36 and is secured to both with the machine screws 50. As a consequence, the input shaft 32 and its flange 48, the ring gear 46, and the electromagnet 60 all rotate as a unit about the axis X. The electromagnet 60 has a cylindrical surface 62 that is presented inwardly toward the axis X and further contains a coil 64 to which electrical current is supplied through a set of stationary brushes 66 and a set of slip rings 68 which rotate with the electromagnet 60.

In addition to the electromagnet 60 and its coil 64, the clutch 38 has an armature 70 which is located within the electromagnet 60 and includes a sleeve 72 that fits over the stub shaft 44 of the planetary gear set 36, it being coupled to the stub shaft 44 through mating splines. The armature 70 also has a cylindrical surface 74 which is presented outwardly away from the axis X and toward cylindrical surface 62 on the electromagnet 60, there being a small gap g between the cylindrical surfaces between 62 and 74. Opening out of the ends of the armature 70 are annular cavities 76 which contain antifriction bearings 78 that support the electromagnet 60 on the armature 70.

The bearings 78 fit around the sleeve 72 of the armature 70 and the electromagnet 60 in turn fits around the bearing 78. The arrangement is such that the input shaft 34, the ring gear 46, and the electromagnet 60 rotate as a single unit about the axis X, and likewise the stub shaft 44, sun gear 42 and armature 70 rotate as another unit about the axis X. Normally the two units rotate at slightly different angular velocities, induced by the axle or tire design. When the clutch 38 engages, the stub shaft 44 and the sun gear 42 provide the required reaction torque to make the two units rotate together.

Figure 5:
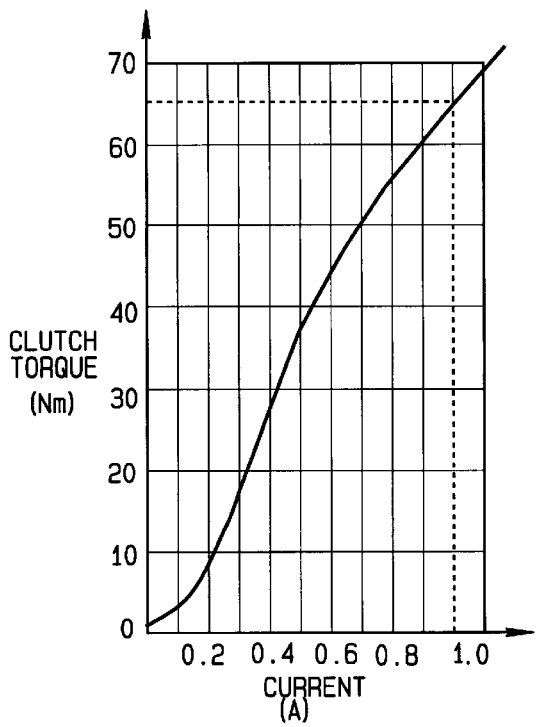
FIG. 5 is a graph showing the torque transferred by the clutch of the coupling as a function of the current in the magnetic clutch of the coupling.

The clutch 38 contains fine particles 80 of a ferrous substance that can be magnetized, and they exist in the gap g. The bearings 78 are isolated from the magnetic particles 80 by seals 82. When the coil 64 is energized with electrical current, the particles 80 become magnetized and connect the electromagnet 60 with the armature 70 such that torque can be transferred between the two, yet slippage between the two can occur as well. The amount of torque transferred depends solely on the amount of current conducted by the coil 64, and is totally independent of the magnitude of the slippage or the temperature. Indeed, the relationship between torque and current, when plotted on Cartesian coordinates, closely approaches being linear (FIG. 5). The microprocessor to which the sensors feed signals reflecting the driving conditions of the vehicle A or B controls the amount of current supplied to the coil 64 of the clutch 38. However, the amount of current may also be controlled by a manually operated device such as a rheostat.

In the operation of the vehicle A or B, the motor 6 generates torque which is transferred through transmission 8 which has the capacity to alter the torque, so that the torque delivered at the shaft 10 of the transmission 8 may be different from that delivered by the motor 6. Some of the torque at the transmission shaft 10 is delivered to the primary driving wheels 2 through the primary differential 10 without any slippage between the wheels 2 and the transmission shaft 10. The remaining torque is delivered to the secondary wheels 4 with some slippage between the transmission shaft 10 and the secondary wheels 4, and that slippage occurs within the torque coupling 14. The total amount of torque delivered at the primary wheels 2 and at the secondary wheels 4 basically equals the torque in the shaft 10 of the transmission 8. However, the apportionment of that torque between the primary wheels 2 and the secondary wheels 4 may not be equal and under most driving conditions is not. The apportionment of torque between the primary wheels 2 and the secondary wheels 4 is dependent on the amount of current passing through the coil 64 in the clutch 38 of the torque coupling 12. The greater the current, the higher the proportion of torque transferred to the secondary wheels 4 (FIG. 5).

The shaft 10 of the transmission 8, being coupled to the input shaft 32 of the torque coupling 14, rotates the input shaft 32 and transfers torque to the input shaft 32. Within the coupling 14 the torque splits into two paths and then recombines, so that the torque in the output shaft 34 of the coupling 14 essentially equals the torque in the input shaft 32, at least when minimum slippage occurs in the clutch 38. In one path—the mechanical path—the torque passes from the input shaft 32 and its flange 48 to the ring gear 46 of the planetary gear set 36, through planet gears 52, thence to the planet carrier 54, and finally to the output shaft 34. For the other path—the clutch path—the torque passes from the input shaft 32 and its flange 48 to the electromagnet 60 of the clutch 38, then through the magnetic particles 80 in the gap g between the electromagnet 60 and the armature 80, then to the sun gear 42 of the planetary set 36 through its stub shaft 44, thence through the planet gears 52 and finally through the carrier 54 to the output shaft 34. The hookups between the planetary gear set 36 and the clutch 38 are such that the mechanical path transfers more torque than the clutch path.

The division of torque between the two paths depends on the gear ratio U between the ring gear 46 and the sun gear 42:

$$U = \text{teeth on ring gear 46/teeth or sun gear 42}$$

Figure 6:
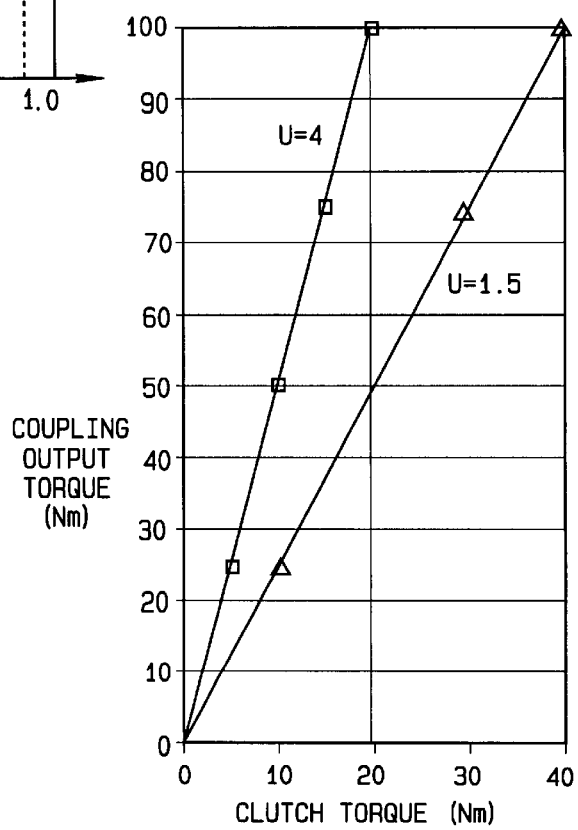
FIG. 6 is a graph showing the torque transmitted through the coupling as a function of the torque transmitted through its clutch.

The higher the ratio U, the less the amount of torque transferred through the clutch path and conversely the more torque transferred through the mechanical path. The relationship may be demonstrated with a plot on Cartesian coordinates of the output torque for the coupling 14, that is the torque in the output shaft 34, against the torque in the clutch 38 (FIG. 6).

Referring to the two plots (FIGS. 5 & 6), a reduction of the current in the coil 64 of the clutch 38 will reduce the torque transmitted through the clutch path, and that in turn will reduce the total torque delivered through the output shaft 34 to the secondary wheels 4. Since the torque in the output shaft 34 generally equals the torque in the input shaft 32, a lesser amount of torque is diverted from the shaft 10 of the transmission 8 to the input shaft 32 of the coupling 14, leaving a greater amount to be transferred to the primary driving wheels 2. Conversely, when the current in the coil 64 of the clutch 38 increases, the clutch 38 transfers more torque which translates in more torque in the clutch path and a proportionally greater torque at the output shaft 34—and at the input shaft 32 as well. The greater demand for torque by the input shaft 32 leaves less torque for the primary drive wheels 2. Thus, the amount of current passing through the coil 64 of the magnetic particle clutch 38 determines the proportion of the total torque at the transmission shaft 10 which is diverted through the torque coupling 14 and that is of course the amount of torque delivered to the secondary wheels 4. The remaining torque from the transmission shaft 10 goes to the primary wheels 2. In short, the current in the coil 64 of the magnetic particle clutch 38 controls the division of torque between primary wheels 2 and the secondary wheels 4, and that current is the only control parameter for the clutch 38, this being in contrast with conventional plate-type clutches in which the pressure applied to the plates, the amount of slippage in the clutch and other variables, such as temperature, control the amount of torque transferred through such clutches. Moreover, the relationship between torque and current is nearly linear which affords good control.

The clutch 38 sees some slippage under typical driving conditions, with the input shaft 32 rotating slightly faster than the output shaft 34, but the difference in angular velocities is not substantial and produces only a very small dissipation of power.

Most of the torque transferred through the torque coupling 12 passes through the mechanical path and relatively little through the clutch path. Hence, the clutch 38 may be relatively compact and light in weight. Moreover, the coil 64 and the current passing through it controls torque transferred through the coupling 14, which is considerably less complex than pistons, ball ramps and other devices used in plate-type clutches.

The sensors in the vehicle A or B monitor driving conditions experienced by the vehicle at any instant and send signals, which reflect those operating conditions, to the microprocessor. The microprocessor in turn controls the amount of current that passes through the coil 64 of the clutch 38, so that the torque transferred to the primary wheels 2 and the torque transferred to the secondary wheels 4 best suits those driving conditions.

Figure 7:
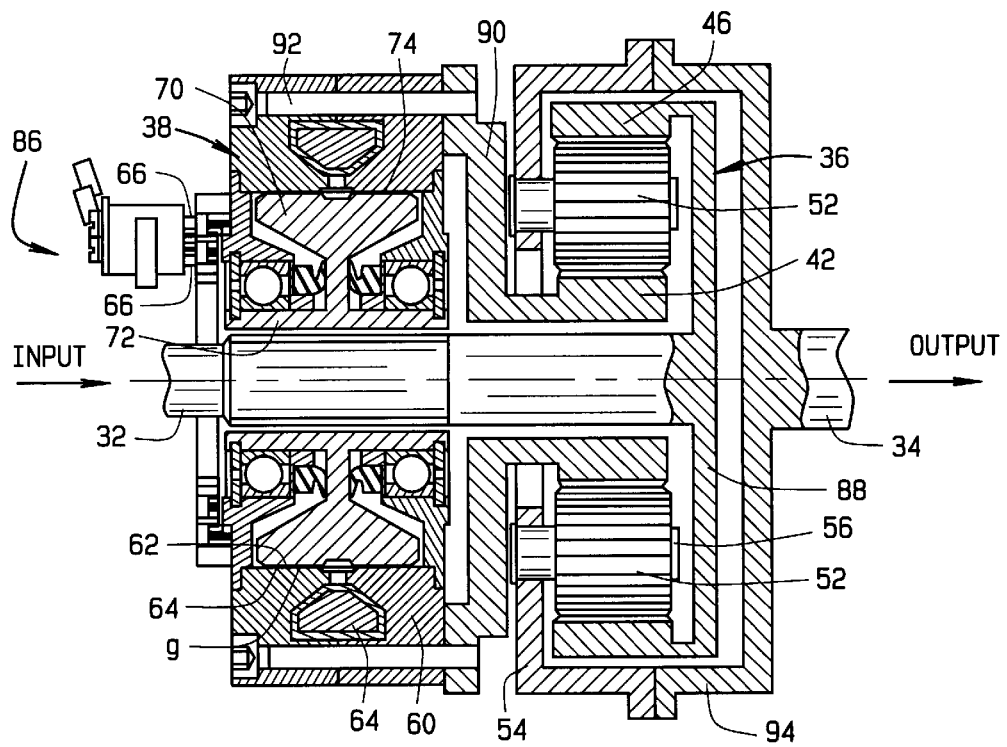
FIG. 7 is a longitudinal sectional view of a modified torque coupling.

A modified torque coupling 86 (FIG. 7) relies on the same kinematic principle as the coupling 14 (FIG. 4), but possesses a somewhat different configuration. In the modified coupling 86 the input shaft 32 extends through the sleeve 72 on the armature 70 for the clutch 38, and also through the sun gear 42 of the planetary set 36. While the shaft 32 and sleeve 72 are engaged through mating splines, the sun gear 42 is free to rotate around the shaft 32. Beyond the sun gear 42, the input shaft 32 is connected to the ring gear 46 through a flange 88. The sun gear 42, on the other hand, is coupled to another flange 90 which in turn is secured to the electromagnet 60 of the clutch 38 with machine screws 92 that pass through the electromagnet 60 and thread into the flange 90. The output shaft 34 is coupled to a drum 94 within which the planetary set 36 rotates, and the drum 94 is connected to the carrier 54 of the planetary set 36.

Figure 8:
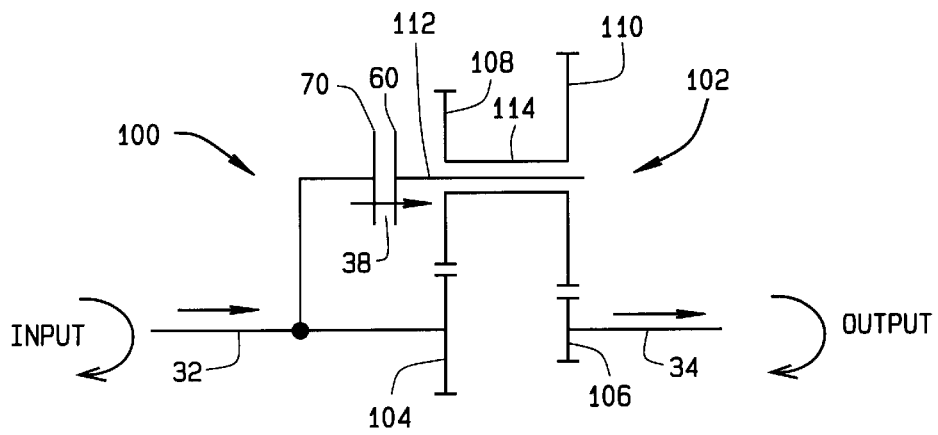
FIG. 8 is a kinematic diagram of another modified torque coupling.

Another modified coupling 100 (FIG. 8) utilizes essentially the same clutch 38, but relies on a planetary set 102 that operates on a kinematic principle somewhat different from the sets 36 for the couplings 14 and 86. The planetary set 102 includes two sun gears 104 and 106. While the two sun gears 104 and 106 rotate about the axis X, they are detached from each other, with the gear 104 being connected to the input shaft 32 and the gear 106 being connected to the output shaft 34. The sun gears 104 and 106 mesh with planetary gears 108 and 110 which are coupled to a carrier 112 having spindles 114. Indeed, the planetary gears 108 and 110 are organized in pairs, with each pair including a single planetary gear 108 and a single planetary gear 110 located around a single spindle 114 of the carrier 112. The planetary gears 108 and 110 of a pair are joined together so that they rotate in unison and at the same angular velocity about their spindle 114. The carrier 112 is attached to the electromagnet 60 of the clutch 38, whereas the armature 70 of the clutch 38 is attached to the sun gear 104 and of course to the input shaft 32 as well. The gears 104, 106, 108 and 110 and the carrier 112 all constitute elements of the planetary set 102.

In the operation of the coupling 100 the torque applied at the input shaft 32, within the coupling 100, splits into a mechanical path and a clutch path and then recombines so that the torque at the output shaft 34 is essentially the same as the torque applied to the input shaft 32. In the mechanical path the torque passes from the sun gear 104 to the planet gears 108 and likewise to the planet gears 110 to which the gears 108 are joined, and thence to the other sun gear 106 and the output shaft 34 to which it is connected. In the clutch path, the torque passes from the input shaft 32 to the armature 70 of the magnetic particle clutch 38 and thence to the electromagnet 60 of the clutch 38. The electromagnet 60, being coupled to the planet gears 108 and 110 through the carrier 112, causes the carrier 112 and planet gears 108 and 110 to rotate about the axis X and thus transfer torque from the electromagnet 60 of the clutch 38 to the sun gear 106, with which the planet gears 110 are engaged, and of course to the output shaft 34 to which the sun gear 106 is connected.

Figure 9:
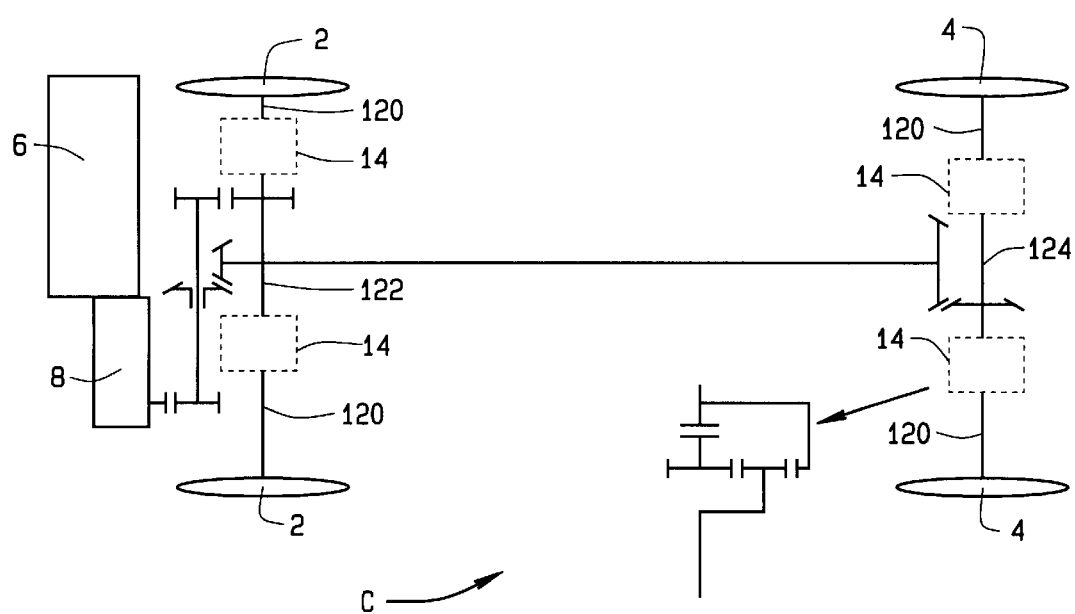
FIG. 9 is a schematic view of an automobile with the torque coupling of the present invention located at each wheel.

Whereas a single torque coupling 14 apportions torque between the primary wheels 2 and the secondary wheels 4 in the vehicles A and B, multiple coupling 14—or for that matter multiple couplings 86 or 100—may be used to apportion torque among all four wheels 2 and of 4 of still another vehicle C (FIG. 9). In the vehicle C each wheel 2 and 4 has its own axle shaft 120, and each axle shaft 120 is connected to the output shaft 34 of a separate torque coupling 14. The two torque couplings 14 at the front of the vehicle C have their input shafts 32 connected to a common cross shaft 122. The same holds true at the rear of the vehicle; the input shafts 32 for the two rear couplings 14 are connected to another cross shaft 124. Both cross shafts 122 and 124 are connected to the shaft 10 of the transmission without intervening differentials 12 or 16 or an intervening coupling 14. In the operation of the vehicle C, the torque delivered at the shaft 10 of the transmission 8 is transferred to the cross shafts 122 and 124 without any slippage between the transmission shaft 10 and either of the cross shafts 122 or 124. The four couplings control 14 the torque delivered to the individual wheels 2 and 4, so the torque at the transmission shaft 10 is apportioned amongst the four wheels 2 and 4 by varying the current in the electromagnets 60 of the clutches 38 for the four couplings 14. For example, if one of the wheels 4 begins to slip, the current passing through the clutch 38 for the coupling 14 at that wheel 4 may be reduced, and this has the effect of transferring more torque to the remaining wheels 2 and 4 which have better traction.

Other variations are possible and they may employ the same planetary sets 36 or 102 with different hookups or even different planetary sets. Irrespective of the hookup or planetary set, the arrangement should split the torque into a mechanical path and a clutch path, with most of the torque passing through the mechanical path. In the same vein, the input shaft 32 and output shaft may be reversed, so that torque is applied to the shaft 34 and delivered from the shaft 32. Moreover, the planetary sets 36,102 need not rely on gearing, but instead on friction surfaces, thus becoming traction devices or drives. Actually, the couplings 14,86,100 need not be confined to the transfer of torque to the secondary wheels 4 of a vehicle. They have applications in machinery other than that in automotive vehicles, and even in automotive vehicles may be used in different locations.

What is claimed is:

1. A torque coupling comprising:
   an input torque member adapted to be connected to a source of torque;
   an output torque member from which torque is delivered;
   a magnetic particle clutch having first and second clutch members which rotate about a common axis, the clutch being capable of transferring torque between the clutch members when the clutch members rotate at different angular velocities, the first clutch member being connected to one of the torque members;
   a planetary gear set organized about the same axis and coupled to the clutch and to the input and output members such that torque transfers between the input and output members in two paths, one of which includes the clutch and the other of which does not include the clutch, the planetary pear set including first, second, third and fourth elements organized about the axis, the first element being connected to the first clutch member and to said one of the torque members, the second element being connected to the second clutch member such that all of the torque transferred through the clutch passes through the second element, the third element being connected to the other torque member, and the fourth element being connected between the first element and the second element and between the second element and the third element, the elements of the planetary pear set being configured such that most of the torque that is transferred between the input and output members transfers through the path that does not contain the clutch.

2. A torque coupling according to claim 1 wherein the clutch members have opposed faces, and the clutch further comprises magnetic particles between the opposed faces and an electrical coil at the clutch members, whereby the torque transferred between the clutch members depends on the current passing through the coil.

3. A torque coupling according to claim 2 wherein one of the clutch members is located within the other clutch member.

4. A torque coupling according to claim 3 wherein the first clutch member surrounds the second clutch member.

5. A torque coupling according to claim 3 wherein the second clutch member surrounds the first torque member.

6. A torque coupling according to claim 2 wherein the second element is a sun element which rotates about the axis; wherein the first element is a ring element located around the axis; wherein the fourth element is a planetary element located between and engaged with the sun and ring elements; and wherein the third element is a carrier element which rotates about the axis and on which the planetary elements rotate.

7. A torque coupling according to claim 2 wherein the first element is a sun element which rotates about the axis; wherein the third element is also a sun element which rotates about the axis; wherein the fourth element is a planetary element engaged with the two sun elements; and wherein the second element is a carrier element about which the fourth element rotates.

8. A torque coupling comprising:
   a magnetic particle clutch having inner and outer clutch members organized around an axis and provided with opposed closely spaced surfaces, magnetic particles in the space between the surfaces, and a coil at the members, all such that the torque transmitted by the clutch depends on the current in the coil;
   a planetary gear set organized around the same axis and including a sun gear connected to one of the clutch members such that all of the torque transferred through the clutch passes through the sun gear, a ring gear surrounding the sun gear and connected to the other clutch member, a planetary gear located between and engaged with the sun and ring gears, and a carrier rotatable about the axis and having a spindle about which the planet gear rotates; and input and output torque members, one of which is connected to the ring gear and the other clutch member and the other of which is connected to the carrier, whereby torque transfers between the input and output torque members in two paths, one of which includes the clutch and the other of which does not include the clutch;

the elements of the planetary set being configured such that most of the torque transfers between the input and output members through the path that does not include the clutch.

9. A torque coupling comprising: a magnetic particle clutch containing a coil and a planetary set connected with the clutch such that a mechanical path and a clutch path exist through which torque is transferred through the coupling, with the amount of torque transferred through the clutch path in relation to the amount transferred through the mechanical path being variable and dependent on the current passing through the coil, but always such that more torque passes through the mechanical path than the clutch path.

10. A torque coupling according to claim 9 wherein the clutch members rotate about a common axis and the planetary gear set is organized about the same axis.

11. A torque coupling according to claim 9 wherein the magnetic particle clutch has inner and outer clutch members organized around an axis and provided with opposed closely spaced surfaces, magnetic particles in the space between the surfaces, and the coil is in one of the members, all such that the torque transmitted by the clutch depends on the current in the coil; and wherein the planetary gear set is organized around the same axis and includes a first sun gear connected to the inner clutch member, a second sun gear, joined-together planet gears engaged with the first and second sun gears, and a carrier rotatable about the axis and having spindle about which the planet gears rotates, the carrier being connected to the outer clutch member.

12. A torque coupling according to claim 11 and further comprising torque input and output members, one of which is connected to one of the clutch members and first sun gear and the other of which is connected to the second sun gear.

13. A torque coupling comprising:

a first torque member through which torque is applied to the coupling;

a second torque member through which torque is delivered from the coupling;

a magnetic particle clutch having first and second clutch members which are capable of rotating at different angular velocities and an electric coil, the clutch having the capability of transferring torque between the clutch members when the clutch members rotate at different angular velocities, with the amount of torque transferred through the clutch being dependent on the current passing through the coil, the first clutch member being connected to one of the torque members; and a planetary gear set including first, second, third and fourth planetary elements organized about an axis, the first planetary element being connected to the first clutch member and to one of the torque members, the second planetary element being connected to the second clutch member such that all of the torque transferred through the clutch passes through the second element, the third planetary element being connected to the other torque member; and the fourth planetary element being located between first and third planetary elements and between the second and third planetary elements, the configuration of the planetary set being such that the amount of torque transferred through the clutch represents less than one-half of the total torque transferred between the first and second torque members through the coupling.

14. A torque coupling according to claim 13 wherein the clutch members rotate about the axis around which the planetary set is organized; and wherein the second planetary element is a sun gear, the first planetary element is a ring gear that surrounds the sun gear, the fourth planetary element is a planet gear that is located between and engages the sun and ring gears, and the third planetary element is a carrier that rotates about the axis and provides an axis about which the planet gear revolves.

15. A torque coupling according to claim 13 and further comprising means for varying the current in the electric coil of the clutch to control the amount of torque transferred through the clutch and through the coupling.

* * * * *